(No Model.)
J. McCLURG.
MACHINE FOR ARRANGING CRACKERS FOR PACKING.
No. 326,769. Patented Sept. 22, 1885.
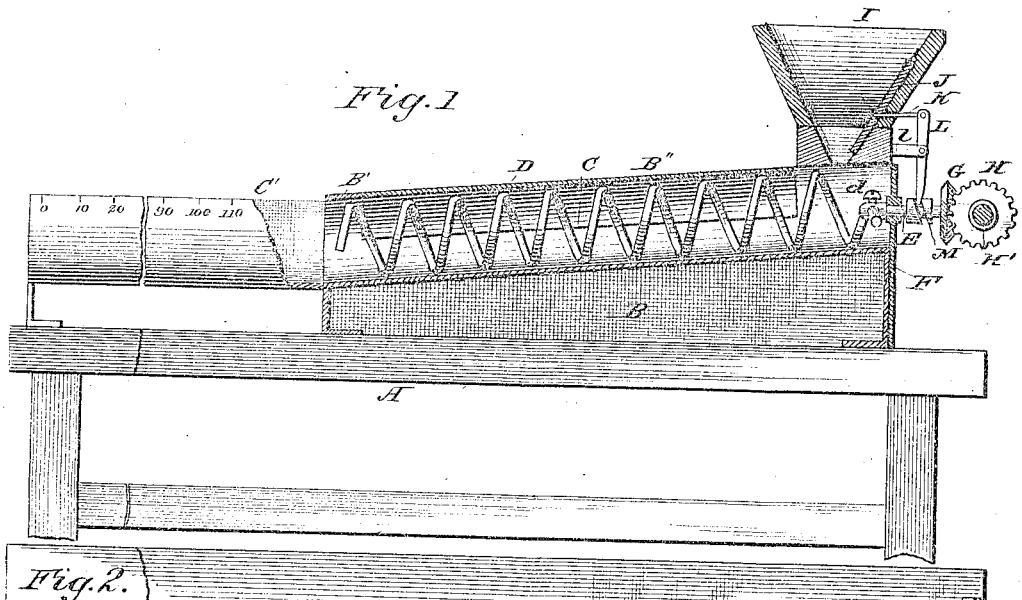
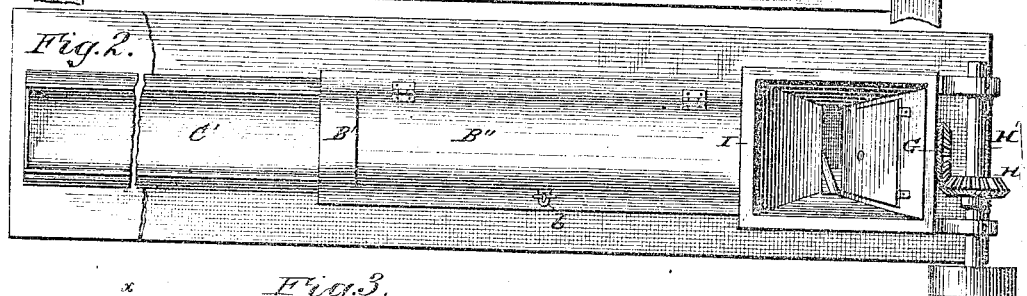
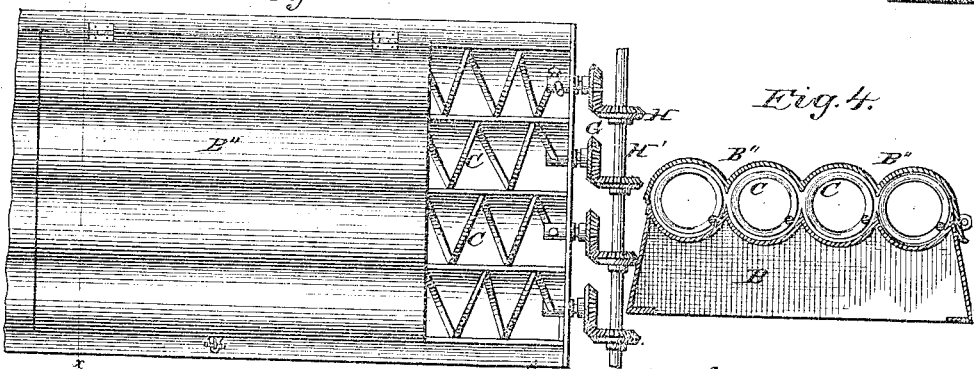
WITNESSES:
James McClurg INVENTOR.
Tyner & Walker ATTORNEYS.

UNITED STATES PATENT OFFICE.

JAMES McCLURG, OF ALLEGHENY, PENNSYLVANIA.

MACHINE FOR ARRANGING CRACKERS FOR PACKING.

SPECIFICATION forming part of Letters Patent No. 326,769, dated September 22, 1885.

Application filed July 11, 1885. (No model.)

*To all whom it may concern:*

Be it known that I, JAMES MCCLURG, a citizen of the United States, residing at Allegheny, in the county of Allegheny and State of Pennsylvania, have invented certain new and useful Improvements in Machines for Arranging Crackers and like Articles for Packing; and I do hereby declare the following to be a full, clear, and exact description of the invention, such as will enable others skilled in the art to which it appertains to make and use the same.

My invention relates to improvements in machines for arranging crackers, ginger-snaps, and like articles for packing.

The invention consists in the combination, in a machine for arranging crackers and like articles for packing, with a casing provided with one or more channel-ways, of one or more spirally-coiled conveyers, the coils of which are closely wound, located in said way or ways, suitable mechanism for actuating said conveyer or conveyers, and one or more receptacles in communication with the way or ways.

The invention consists, also, in the combination, with a casing provided with one or more channel-ways, a covering-strip at the lower end of the casing, and a hinged lid, of one or more spirally-coiled conveyers, the coils of which are closely wound, located in said way or ways, suitable mechanism for actuating said conveyer or conveyers, one or more hoppers located above the upper end of the way or ways, and one or more receptacles in communication with the way or ways.

Figure 1 of the drawings is a vertical longitudinal section of my machine. Fig. 2 is a plan view of Fig. 1. Fig. 3 is a plan view showing a casing provided with a series of channel-ways with the conveyers therein. Fig. 4 is a transverse section taken through the line *x x*, Fig. 3, illustrating the formation of the lid.

A represents a frame upon which the machine is mounted.

B represents a casing, constructed of any suitable material, having a slight downward inclination toward its lower end. In the casing is formed a channel-way, C, and over the lower end of this way is a short covering-strip, B'. Hinged to one side of the casing is a lid, B'', provided on its front side with a latch, *b*. The lid covers the channel-way from the covering-strip to the base of the hopper. The channel-way is preferably concave, and strip B' and lid B'' convex, so that the conveyer works in a practically round opening, as clearly shown in Fig. 4. However, while I deem these shapes preferable, I do not limit my invention in this particular.

At the lower end of the casing, and forming a continuation of the channel-way, is a receptacle, C', to receive the crackers as they are carried forward by the conveyer. The receptacle has a scale marked upon it, the purpose of which will be hereinafter stated.

D represents the conveyer, which is a spiral coil, preferably of wire. The coils of the conveyer are closely wound, and therefore stand in an approximately-vertical position. This is essential in order that the articles being conveyed may be held upright. The conveyer is located in channel-way C, and is adapted to revolve freely therein, one end being steadied in its movement by strip B', and the other end being attached to a short shaft, E, having bearing in a plate, F, attached to the front of casing B.

A convenient mode of attaching the coil to the shaft is by inserting the end of the former through a hole in the latter and binding it therein by a set-screw, *d*, as illustrated. Motion may be given to this shaft by any suitable means; but I prefer to drive it by means of bevel-gears G H and shaft H'.

Mounted over the upper end of the channel-way C is a hopper, I, for containing the articles to be fed to the conveyer. The opening at the lower end of the hopper is of a size sufficient to permit the crackers to pass through edgewise only, and in order to feed the crackers down to the opening it is desirable that some means should be provided for giving them slight movement. For this purpose I hinge a board, J, which I call an "agitator," to the inside of the hopper, and to this agitator I attach an arm, K, which passes through a hole in the wall of the hopper, and is pivoted to a lever, L, pivoted in a bracket, *l*, secured to the hopper, the lower end of which lever takes into a grooved cam, M, on the shaft E.

The operation of the machine is as follows:

The hopper being filled with crackers, power is applied to shaft H', and through gears H G is transmitted to shaft E. In the revolution of shaft E the cam thereon operates lever L, which in turn vibrates the agitator, thereby shaking the crackers down to the opening in the hopper, through which they drop into a coil of the conveyer, and are carried by the revolutions of the conveyer toward the outer end of the machine. As they leave the conveyer and enter the receptacle the first three or four having no support in front will probably fall; but they will afford ample support for the column behind. By means of the scale of numbers on the receiver the operator is enabled to pick up any desired number of crackers at once, thereby greatly facilitating the labor of packing them into the boxes or barrels.

It is evident that the casing may be constructed with several channel-ways covered by a lid, each channel-way containing a conveyer and provided with a hopper, without in the least departing from the spirit of my invention.

In Figs. 3 and 4 of the drawings I have illustrated a machine with four channel-ways which are covered by a lid having concave depressions in its under side—one for each channel-way—and of a width corresponding to that of the way.

For the purpose of clearly illustrating the group of channel-ways and the conveyers therein, I have in Fig. 3 omitted the hoppers, they not being necessary to a clear understanding of the invention.

I am aware that in certain machines for mixing dough two screws twisted in reverse order and working in opposite directions in a single trough are employed; but such devices are not analogous to mine, either in construction or operation, and I lay no claim thereto.

Having thus described my invention, what I claim, and desire to secure by Letters Patent, is—

1. In a machine for arranging crackers and like articles for packing, the combination, with a casing provided with one or more channel-ways, of one or more spirally-coiled conveyers, the coils of which are closely wound, located in said way or ways, suitable mechanism for actuating said conveyer or conveyers, and one or more receptacles in communication with the way or ways, substantially as described.

2. The combination, with a casing provided with one or more channel-ways, of one or more spirally-coiled conveyers, the coils of which are closely wound, located in said way or ways, suitable mechanism for actuating said conveyer or conveyers, one or more hoppers located above the upper end of the way or ways, and one or more receptacles in communication with the way or ways, substantially as described.

3. The combination, with a casing provided with one or more channel-ways, a covering-strip secured over the top of the outer end of the casing for steadying the outer end of the conveyer or conveyers, a lid for covering the channel way or ways from the covering-strip to the base of the hopper or hoppers, and a bearing-plate attached to the front of the casing, of one or more closely-wound spiral conveyers located in the channel way or ways, one or more shafts, as E, provided with a bevel gear or gears, as G, for operating the conveyer or conveyers, a shaft, as H', provided with bevel gear or gears, as H, for giving motion to shaft or shafts E, a hopper or hoppers, as I, for containing the articles to be fed to the conveyer or conveyers, and a graduated receptacle or receptacles to receive the articles as they are carried forward by the conveyer or conveyers, all substantially as described.

In testimony whereof I affix my signature in presence of two witnesses.

JAMES McCLURG.

Witnesses:
H. A. HALL,
W. H. MYERS.